No. 742,547. PATENTED OCT. 27, 1903.
G. WRIGHT & F. V. NICHOLLS.
ELECTRICAL SWITCHING SYSTEM.
APPLICATION FILED FEB. 16, 1903.
NO MODEL.
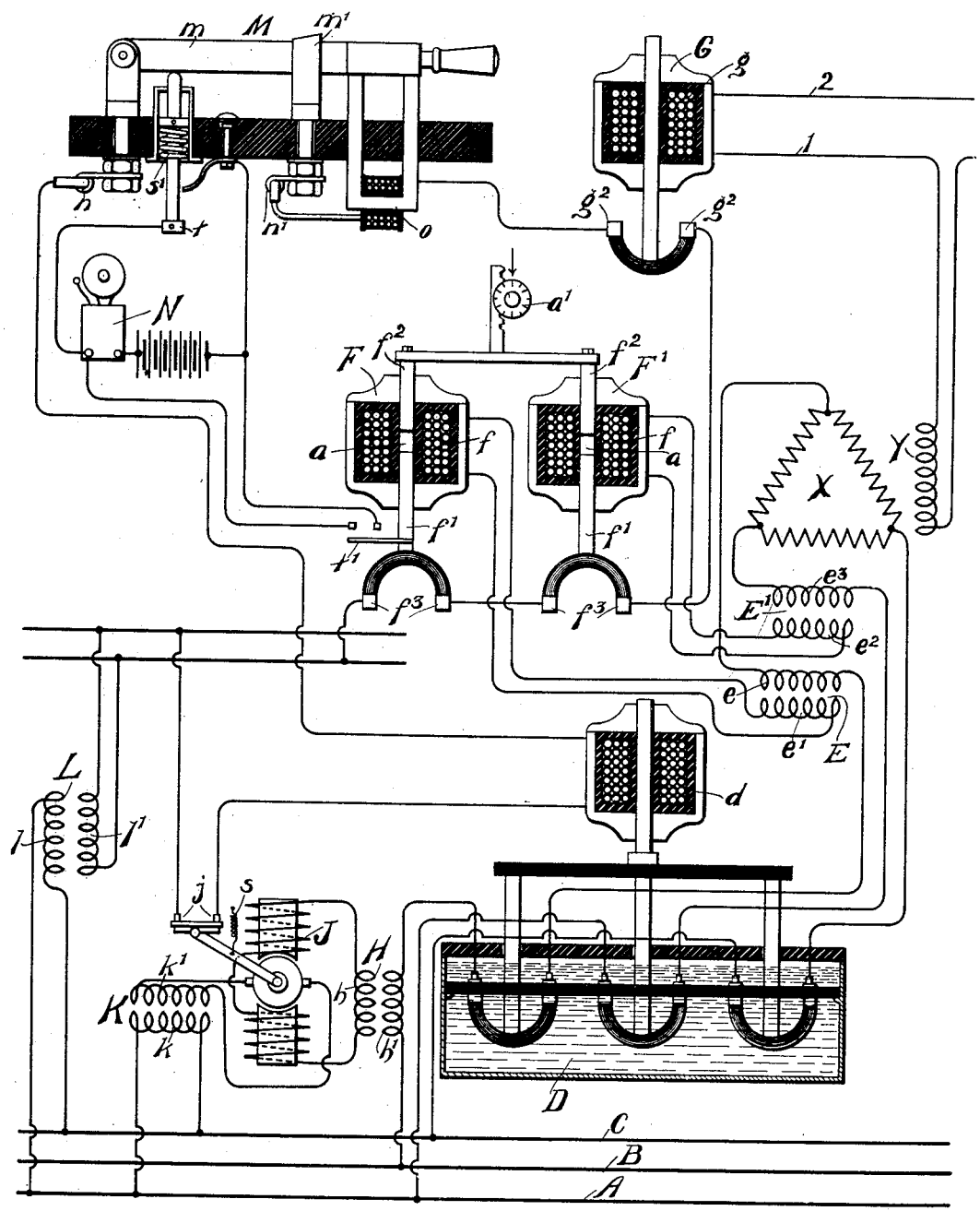
WITNESSES:
Wm H Jones
L. A. Hawkins
INVENTORS
Gilbert Wright, and
Francis V. Nicholls,
BY Richard Eyre
ATTORNEY.

No. 742,547.

Patented October 27, 1903.

UNITED STATES PATENT OFFICE.

GILBERT WRIGHT AND FRANCIS VICTOR NICHOLLS, OF PITTSFIELD, MASSACHUSETTS, ASSIGNORS TO STANLEY ELECTRIC MANUFACTURING COMPANY, OF PITTSFIELD, MASSACHUSETTS, A CORPORATION OF NEW JERSEY.

ELECTRICAL SWITCHING SYSTEM.

SPECIFICATION forming part of Letters Patent No. 742,547, dated October 27, 1903.

Application filed February 16, 1903. Serial No. 143,491. (No model.)

*To all whom it may concern:*

Be it known that we, GILBERT WRIGHT and FRANCIS VICTOR NICHOLLS, citizens of the United States, and residents of Pittsfield, county of Berkshire, State of Massachusetts, have invented certain new and useful Improvements in Electrical Switching Systems, of which the following is a specification.

Our invention relates to switching apparatus for high-potential alternating-current apparatus, such as the switchboard of an alternating-current generator-station or of a line-station.

The object of our invention is to provide a novel combination and arrangement of circuits and switches whereby defective circuit conditions—such as overloads, reverse currents, &c.—may instantly act to open the circuit and whereby the integrity or defectiveness of the circuit conditions may be clearly indicated by a hand-switch which will close the circuit through the various safety-switches and remain closed only when all the safety-switches are closed and therefore circuit conditions are normal, but which will automatically open when abnormal conditions cause any of the safety devices to open and cannot be permanently closed until the circuit conditions are once more normal.

Morever, it is an object of our invention to employ this indicating-switch as a means for closing and opening the main switch of the circuit when desired.

A further object of our invention is to so arrange and connect the switches that all contacts necessary to the proper performance of the several switches are in the circuit when the circuit is closed and in normal condition, so that no dependence need be placed for the operation of the safety devices when conditions are abnormal on the closing of contacts that being ordinarily unused may be in defective condition—as, for example, coated with dust.

Still another object of our invention is to provide a system in which the switchboard-control circuit is an alternating-current circuit, which is advantageous in that the desired parts of the system may be used at substations where direct current is not readily obtainable.

The various means and combination of means we employ to obtain the foregoing advantages will be pointed out hereinafter.

The drawing accompanying this specification is a diagram illustrating an embodiment of our invention.

A B C represent the three mains of a multiphase alternating-current circuit.

D is a high-potential switch of the oil type, connected in the circuit leading from mains A B C to generator X. Thus switch D constitutes the main closing-switch for this circuit. Switch D is held in closed position by current in coil $d$, opening in oil by gravity when no current is passing through said coil.

E E' are transformers whose primaries $e$ $e$ $l$ receive the current passing from two phases of generator X and whose secondaries $e'$ $e^2$ are connected to the coils $f$ of overload-switches F F'. These switches may be, as shown, of a well-known type, in which the coil surrounds a movable core $f'$ and a fixed core $f^2$, separated by an air-gap $a$, the length of which is adjustable by mechanism, as indicated at $a'$. When there is an overload on generator X, causing the switch F or F' to open, the control-circuit is opened and the main switch D is opened, as hereinafter pointed out.

G is a no-field switch, the coil $g$ of which is connected by conductors 1 2 with the generator-field Y and with the source of exciting current, and this switch opens by gravity, as indicated, when the current in the field-circuit, and therefore in coil $g$, falls below a predetermined volume.

H is a transformer whose primary $h'$ receives the current of one phase of generator X and whose secondary $h$ energizes the field-magnet of a relay J.

K is a transformer whose primary $k$ is connected in shunt across the mains A and C and whose secondary $k'$ energizes the armature of said relay. Normally the relay is in the position shown, this being the position that the current in its coil when in normal direction tends to hold it. When no current is flowing, it will be held in this position by spring $s$. When, however, the current in leads to generator X reverses, the armature tends to reverse and is moved from the position shown to open the control-circuit at the contacts $j$. As such reverse-current relays are well known, it is not necessary to describe its rationale further.

L represents the transformer that supplies the current for the local control-circuit. Its primary $l$ is preferably connected in shunt to two of the mains, as shown to mains A and C. Its secondary $l'$ generates the current for the control-circuit. In the said control-circuit is a hand-switch M, which switch is the master-switch of the system. When the blade $m$ of this switch engages the contacts $m'$, it closes that part of the control-circuit between terminals $n$ and $n'$. The switch when once closed will be held closed by the electromagnet $o$, provided the control-circuit in which the coil of this magnet is connected is not open at any point; but if there is no current in the coil of this magnet the switch will be at once opened by spring $s'$.

As the contacts $j$ of the reverse-current relay, the coil $d$ of the main switch D, the coil of the electromagnet $o$ of the master or indicating switch M, the contacts $g^2$ of the no-field switch G, and the contacts $f^3$ of the overload-switches are all in series in the control-circuit, it is clear that when the control-circuit is open at any point the main switch D and the master-switch M must be open. If, therefore, either no-field switch G or overload-switches F F' or reverse-current relay J open, the main circuit is at once interrupted at switch D and indication thereof is at once afforded by the opening of master-switch M. Further indication may be afforded by the closing of a local circuit to an alarm-bell N, if desired, as by contact $t$ on the opening of switch M or by contact $t'$ on the opening of switch F. After an abnormal condition has thus opened the control-circuit, and consequently opened switches M and D and the main circuit, the circuits may again be closed by closing the switch M. If it remains closed, it is a clear indication that the abnormal conditions have been removed and that the switches are all restored to their normal positions.

None of the various switches open by means of short circuits established by the abnormal conditions, but all depend, therefore, either upon an opening of the control-circuit or upon a change in the value of the current in the circuit of their coils. For this reason we have been able to eliminate from the switchboard any normally opened switches, so that we have a system which is certain to be in readiness to properly act for abnormal conditions if it is properly acting for normal conditions.

The particular types of the various switches and safety devices and the particular connections of the various devices shown in the circuits are features that are of no importance to the invention, nor is it necessary that each kind of device here represented should be used, since our invention is obviously of such a character as to be effectively employed with many kinds of safety devices.

Having thus described our invention, what we claim, and desire to protect by Letters Patent, is—

1. The combination of a main alternating-current circuit, a control-circuit, a master-switch therein, an overload-switch having a coil for opening the same receiving current induced by the main circuit and having its contacts connected in the control-circuit, and means for automatically opening the master-switch upon the opening of the control-circuit.

2. The combination of a main alternating-current circuit, a control-circuit, a series of safety devices, each controlled by coils suitably connected outside said control-circuit, the contacts of each of said devices being connected in series with each other in the control-circuit, a master-switch for the control-circuit, and a main circuit-interrupting switch, both of said switches having governing-coils in the control-circuit.

3. The combination of a main alternating-current circuit, a control-circuit, a reverse-current relay, an overload-switch and a no-voltage release-switch, said relay and switches being controlled by coils suitably connected outside of the control-circuit and the contacts of all of said switches being in series with each other in said control-circuit, a main circuit-interrupting switch, a closing-coil therefor in the control-circuit, a master-switch in the control-circuit, and a coil also therein for maintaining the closure of said master-switch.

4. The combination of a main alternating-current circuit, a series of coil-actuated safety-switches each having a closed position which the switch automatically takes under normal conditions and a position to which it moves under the influence of its coils when the circuit of its coils is in abnormal condition, a control-circuit including the contacts of the various safety-switches in series, a master-switch in the control-circuit and a main circuit-interrupting switch, and coils for normally maintaining the closure of said master-switch and said main switch connected in the control-circuit.

5. The combination of a main alternating-current circuit, a control-circuit, a self-opening switch in each circuit, a controlling-coil for each switch connected in series in the control-circuit, a no-voltage release-switch adapted to open and close the control-circuit and having a governing-coil connected in a local circuit, an overload-switch adapted to open and close the control-circuit and having a governing-coil receiving current induced from the main circuit, and a reverse-current relay adapted to open and close the control-circuit, and having governing-coils receiving current induced from the main circuit.

6. The combination of a main alternating-current circuit, a local circuit receiving current induced therefrom, a master-switch and a plurality of safety-switches, the contacts thereof being in series in the local circuit, a governing-coil for said master-switch in said local circuit, governing-coils for said safety-switches connected outside the control-circuit, a main circuit-interrupting switch and a governing-coil therefor in said control-circuit.

Signed at Pittsfield, Massachusetts, this 12th day of February, 1903.

GILBERT WRIGHT.
FRANCIS VICTOR NICHOLLS.

Witnesses:
L. A. HAWKINS,
H. G. STAPLETON.